United States Patent [19]

Phelan

[11] Patent Number: 4,702,062
[45] Date of Patent: Oct. 27, 1987

[54] WINDROW SHAPING APPARATUS

[76] Inventor: Gerald E. Phelan, Rte. 4, Box 4960, Jerome, Id. 83338

[21] Appl. No.: 837,942

[22] Filed: Mar. 10, 1986

[51] Int. Cl.$^4$ .............................................. A01D 43/00
[52] U.S. Cl. ......................................... 56/192; 56/119
[58] Field of Search .................... 56/192, 119, 16.4, 1; 172/538; 171/3, 58

[56] References Cited

U.S. PATENT DOCUMENTS

| 778,123 | 12/1904 | Fetzer | 172/538 |
| 3,136,108 | 6/1964 | Wood | 56/503 X |
| 3,731,468 | 5/1973 | Blumhardt | 56/192 X |

FOREIGN PATENT DOCUMENTS 261497 6/1913 Fed. Rep. of Germany.

Primary Examiner—James A. Leppink
Assistant Examiner—Hoang C. Dang
Attorney, Agent, or Firm—Paul F. Horton

[57] ABSTRACT

Windrow shaping apparatus which is attachable to an existing rake for shaping forage windrows. The apparatus includes an attachment member for affixing the apparatus to a rake; a yoke pivotally engaging the attachment member; and a drum for engaging the forage in the windrow. The yoke and drum are supported at a desired height above ground level and at an inward angle so that the drum engages the top and side portions of the windrow to force the forage down and toward the center of the windrow. The drum includes a plurality of parallel spaced rods about the periphery of the drum to prevent excessive compacting and to prevent adherence of the forage to the drum. A second embodiment of the invention includes two drums carried by separate yokes, the drums both being inwardly inclined toward one another and obliquely placed, one in front of the other so as to overlap for simultaneous shaping of the forage on each side of the windrow without compaction between drums.

5 Claims, 5 Drawing Figures

WINDROW SHAPING APPARATUS

BACKGROUND OF THE INVENTION

1. Field of the Invention

This invention relates to windrow shaping apparatus for forage.

2. Description of the Prior Art

Forage, such as grass, alfalfa, rye grass, timothy, and fescue, and the like is raked into windrows for baling. In windrows, the cut forage is allowed to dry to prevent mildew, mold, and rot and therefore a deterioration of the forage both as to appearance and as to food value. To hasten drying, windrows are often turned to expose more of the forage to the sun and to permit greater air circulation. Compaction of the forage prevents drying and therefore it is important that forage in the windrow be compacted as little as possible.

In various parts of the country, tonnage of forage will exceed three to three and one-half tons per acre. In such areas of dense growth, when windrows are brought together for purposes of baling, the forage becomes unmanageable and will not enter the hay baler, going over both the ends and top of the pickup reel of the baler. Where windrows are too wide or too tall, the baler must make another sweep resulting in excessive costs due to baler travel and time expended.

Known devices which shape or might be used to shape windrows include those disclosed by Blumhardt, U.S. Pat. No. 3,731,468; M.E. Wood, U.S. Pat. No. 3,136,108; and a German patent numbered 261,497. Blumhardt discloses swath treating apparatus having a roller provided with a pair of frusto-conical sections, the apparatus being attached to a swather by chains. The swath treating apparatus of Blumhardt is for grain, as opposed to forage, and is used to move heads of grain close to the center of the windrow so as to shed rain and to firm the windrow to prevent blowing. By its design, the Blumhardt device requires compaction to the bottom of the roller in that both frusto-conical sections are in opposition to compact the material between them. The Blumhardt device is also unusable for forage in that the solid cones, having a large surface area, cause the damp forage to adhere to the cones causing matting of the forage onto the roller rendering it inoperable. The Blumhardt device also permits free upward movement of either side of the roller which, in effect, permits differing angles of contact between the drum and windrow. Wood discloses rollers quite similar to those of Blumhardt and would have the same compaction and adherence problems. The Belgium patent discloses a roller having slats disposed in a conical relationship for placement of grain.

SUMMARY OF THE INVENTION

The present invention overcomes the problem of compaction by providing windrow shaping apparatus which includes a drum, rotatable within a yoke which is, in turn, pivotally suspended from a rake at a selected inward angle relative to ground level to force forage toward the center of the windrow while permitting unrestricted lateral movement of the forage to prevent excessive compaction of the forage. A second embodiment includes a pair of drums, inwardly inclined toward one another, one drum obliquely located forward of the other to work simultaneously therewith to allow unrestrained lateral movement of the forage relative to the other drum. A more complete description of the invention may be found in the appended claims.

It is therefor a primary object of the present invention to provide windrow shaping apparatus which prevents compaction of forage by engaging the forage at an inclined angle to permit unrestrained lateral movement of the forage.

It is also an object of the present invention to provide windrow shaping apparatus which includes a yoke to maintain the drum at a constant inclined angle relative to ground level.

A further object of the present invention is to provide windrow shaping apparatus having a yoke which is pivotally mounted to a rake and which includes a restraint to pivotally hold a forage engaging drum at a selected minimal height above ground level.

Another object of the present invention is to provide windrow shaping apparatus which includes a drum which is cylindrical in shape and which includes a plurality of parallel rectilinear rods or bars about the periphery of the drum to prevent the forage from adhering to the drum and to provide constant speed of the drum in its contact with the forage.

An additional object of the present invention is to provide windrow shaping apparatus which includes two drums, both inwardly inclined toward one another on opposing sides of a windrow and one located in front of the other for simultaneous and yet unrestrained lateral movement of the forage as it contacts the drum.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
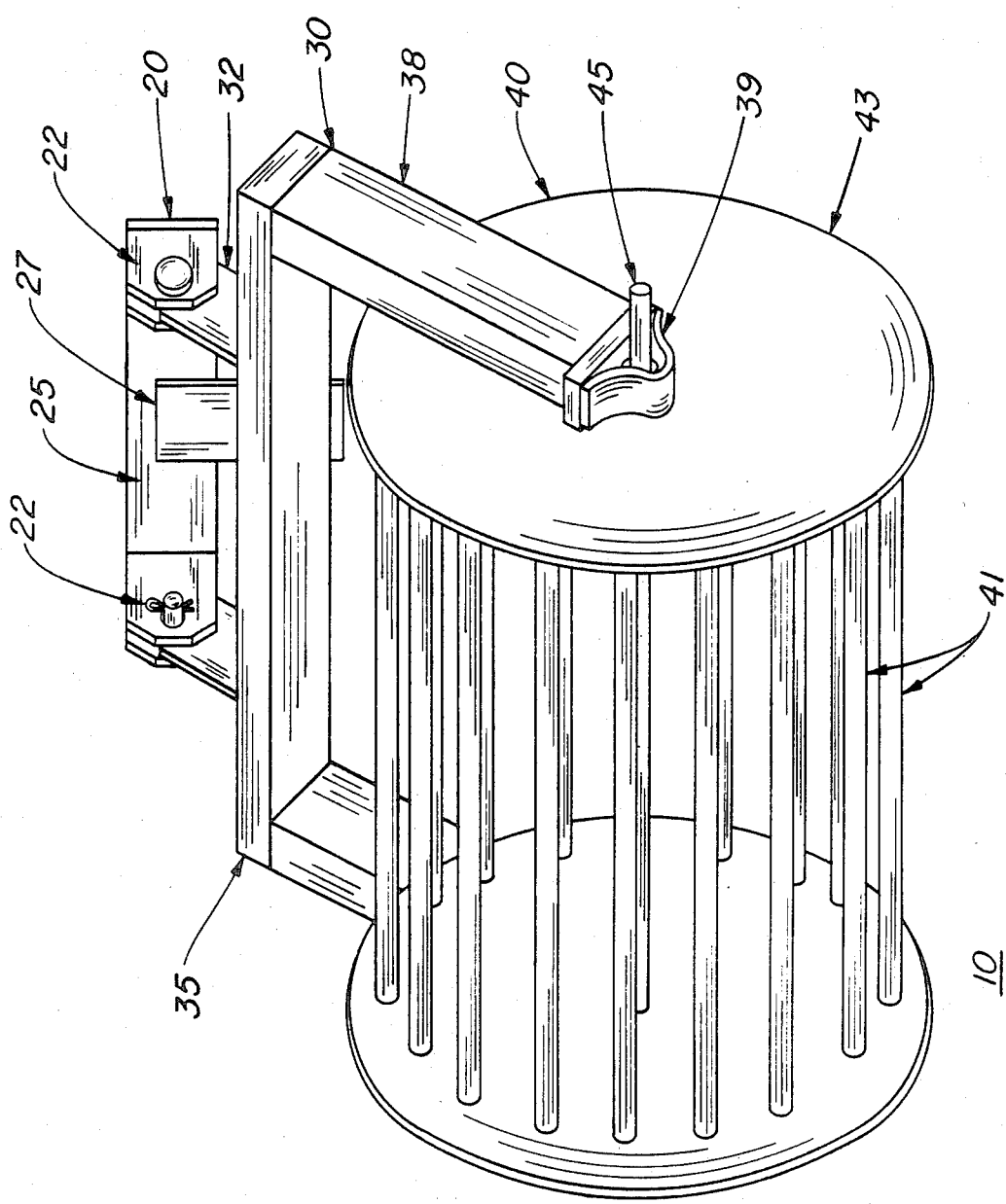
FIG. 1 is a perspective view of one preferred embodiment of the windrow shaping apparatus of the present invention.

Referring now to the drawings, and, more particularly to FIG. 1, one embodiment to be preferred of windrow shaping apparatus 10, made according to the present invention, is disclosed. Windrow shaping apparatus 10 includes, generally, yoke attachment member 20, yoke 30, and drum 40.

Figure 2:
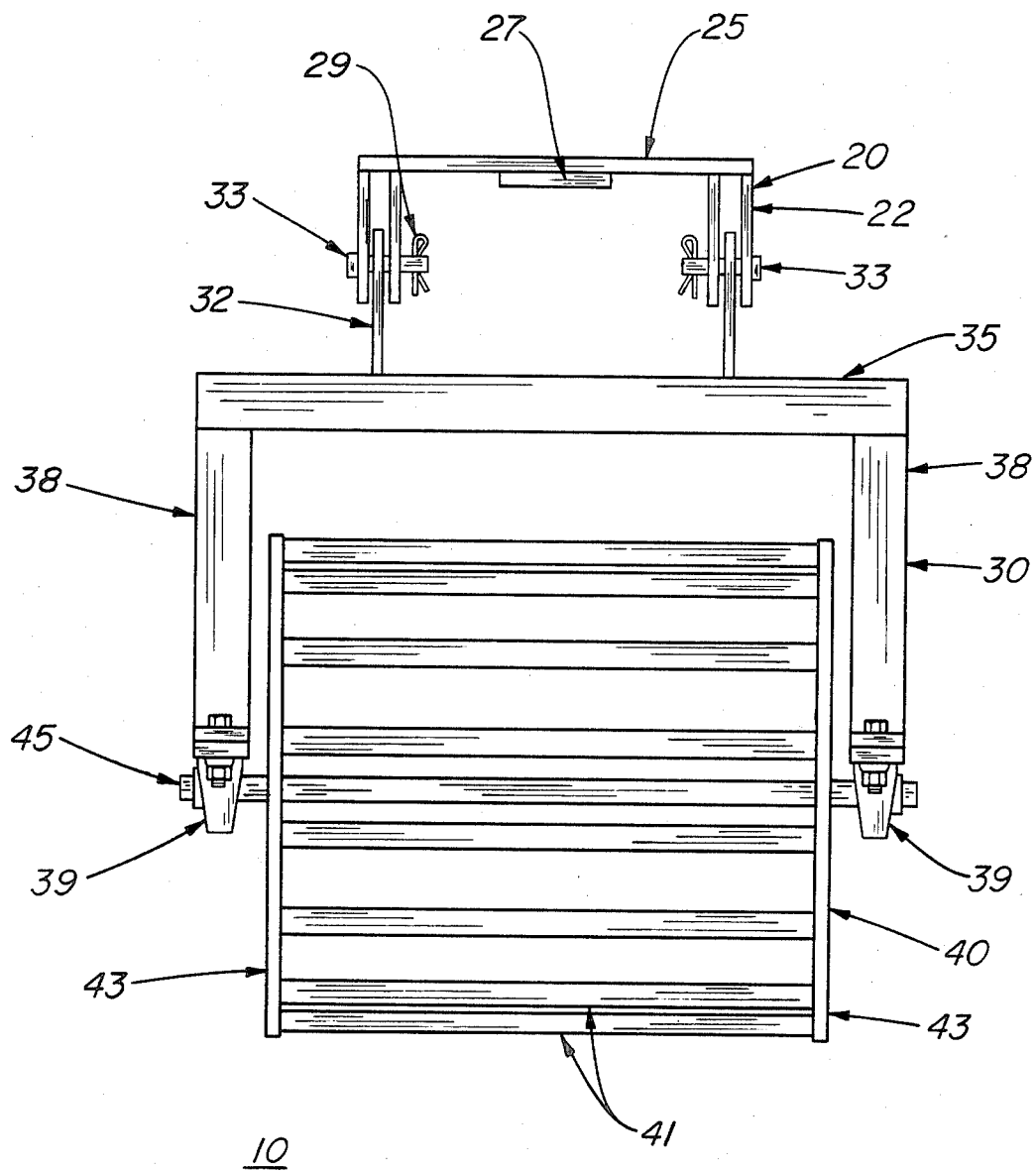
FIG. 2 is a plan view of the apparatus of FIG. 1.
Figure 3:
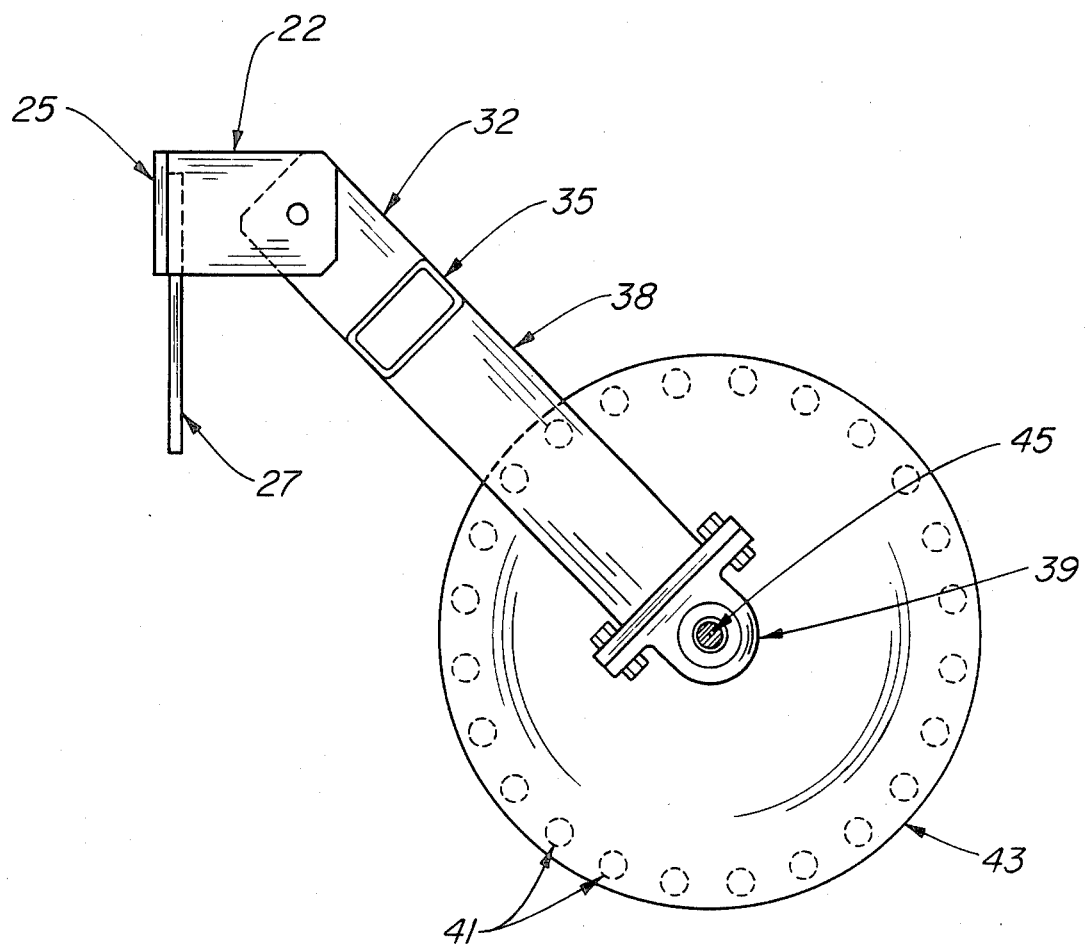
FIG. 3 is a side view of the apparatus of FIG. 1, showing the drum pivoting backwardly.
Figure 4:
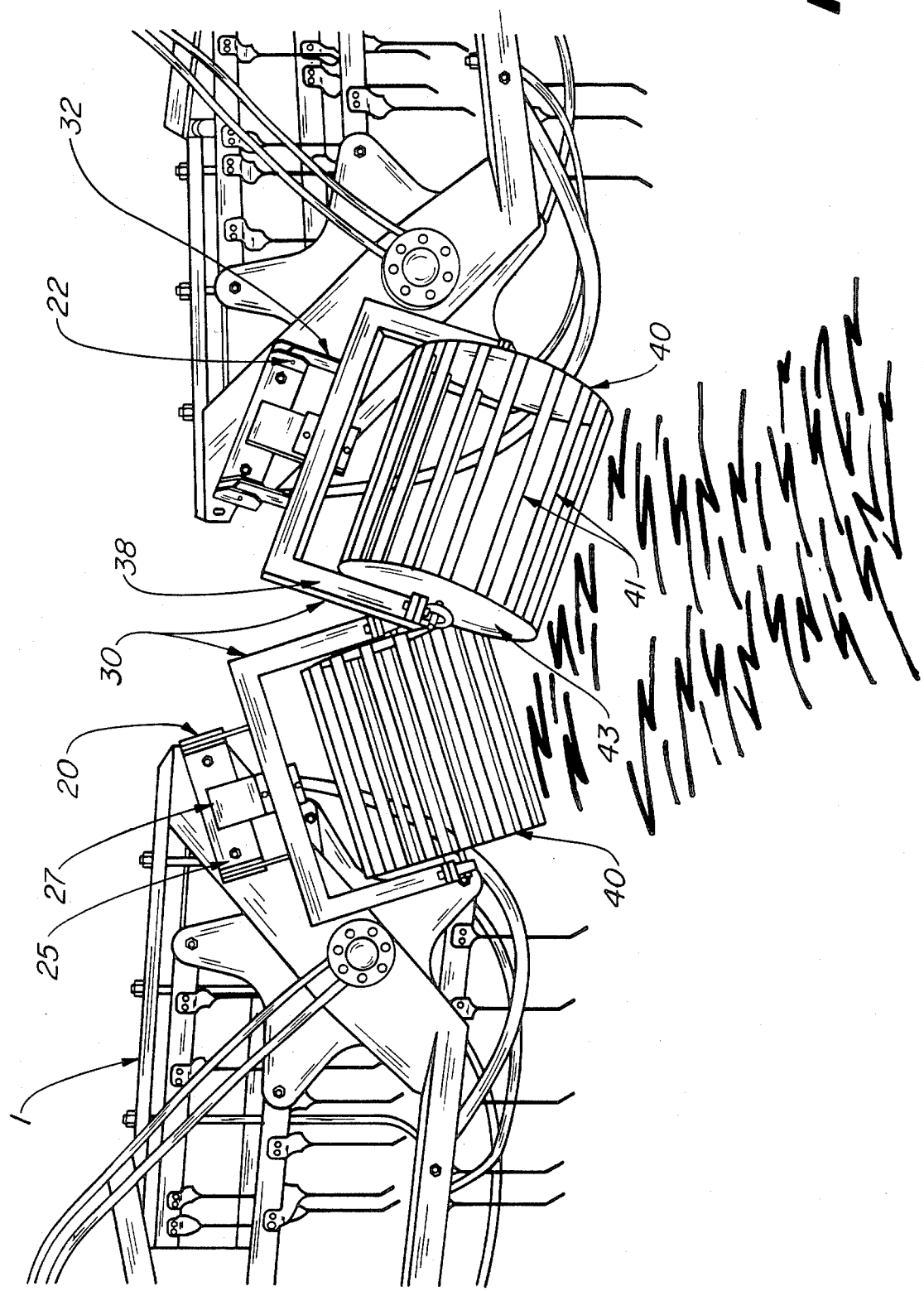
FIG. 4 is a perspective view of a second embodiment of the present invention, shown attached to a rake, the drums being spaced obliquely from one another.

Yoke attachment member 20 includes a back plate 25 which may be welded, bolted, or otherwise attached to the frame of a rake 1, shown partially in FIG. 4. The backplate is provided with a downwardly projecting yoke restraint bar 27 which prevents forward pivot of the yoke and may hold the yoke at a selected minimal distance above ground level. The backplate is also provided with a pair of brackets 22, outwardly projecting rearwardly of the plate. As shown in FIG. 2, receivable within brackets 22 are a pair of ears 32 of yoke 30, each having an aperture, not shown, for the insertion of pins 33, allowing pivoting of the yoke relative to the brackets. Pins 33 may be held in place by any suitable means such as cotter pins 29. Yoke 30 includes a cross bar 35 to which ears 32 are attached. The cross bar also supports a pair of parallel and laterally spaced arms 38, the terminal ends of which are provided with bearings 39 for carrying rotatably mounted axial shaft 45 of drum 40.

Drum 40 includes a pair of parallel and laterally spaced circular end members 43 carried by shaft 45 and a plurality of rectilinear rods 41 extending between the end members and about the periphery of the end members in spaced parallel relationship to one another. If desired, rods 41 may be rotatably mounted on the end members.

Figure 5:
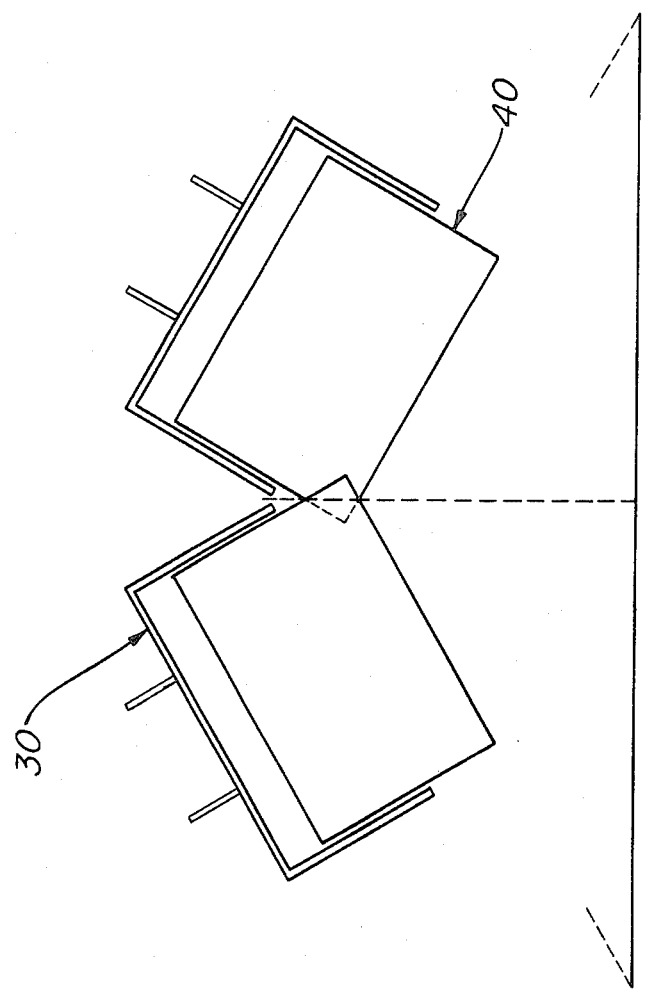
FIG. 5 is a schematic, showing the angle of inclination of drums and showing the overlap of the drums.

Referring now to FIGS. 4 and 5, a second embodiment of the present invention is shown to advantage. The yoke attachment member; yoke; and drum are identical for each embodiment. In both embodiments the yoke and drum are carried at a selected height above ground level; the lowermost portion of the rotatable drum being approximately two feet above ground level at minimum and being pivotal to approximately four and one-half feet above ground level at maximum. Also, in both embodiments, each yoke and drum are set at a selected inward angle of inclination toward the center of the windrow, the angle theta, shown to advantage in FIG. 5, being preferably being between 10 and 25 degrees. Where two drums are used, as in the second embodiment, shown in both FIGS. 4 and 5, the drums are staggered obliquely, one drum being in front of the other so that the paths of the drums overlap, thereby providing unrestrained lateral movement of the forage while, at the same time, compressing the material to a selected height. In this manner, compaction is held to a minimum, there being no compression directly between the two drums. It should also be noted that the same is true using a single drum which, it is obvious, only contacts one side of the windrow. Where two drums are used, the drums contact each side of the windrow, but not in opposition to one another, which would result in excessive packing.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than be the foregoing description, and all changes which come within the meaning and range of equivalency of the claims are therefore to be embraced therein.

I claim:

1. Windrow shaping apparatus, for forage, attachable to the rear of an existing rake, said windrow shaping apparatus comprising:
   at least one yoke attachment member securely engaging said rake;
   at least one yoke, said yoke pivotally engaging said attachment member, said yoke carried at a selected height above ground level; and
   at least one drum, said drum rotatably engaging said yoke and said yoke and said drum being set at an inclined angle relative to the rake and to a windrow, that portion of the drum engaging the edge of a windrow being lower than that portion of the drum engaging the center of the windrow to cause unrestrained compaction by the drum on the forage toward the center of the windrow.

2. The apparatus as described in claim 1 wherein said at least one drum includes a pair of circular end members and a plurality of rectilinear rods extending betwen said end members spaced about the periphery of said end members parallel to one another.

3. The apparatus as described in claim 1 wherein said apparatus includes a pair of yoke attachment members, each member carrying a yoke and a drum for simultaneous shaping of the windrow by contact of the drums on the forage on each side of the windrow.

4. The apparatus as described in claim 3 wherein said drums are spaced diagonally from one another.

5. The apparatus as described in claim 4 wherein said drums overlap one another from front to rear.

* * * * *